United States Patent [19]

Matsushima et al.

[11] Patent Number: 4,710,913
[45] Date of Patent: Dec. 1, 1987

[54] OPTICAL RECORDING DISC
[75] Inventors: Seiichi Matsushima; Toshio Higashihara, both of Ibaragi; Mitsuru Shimizu, Toride; Ken Yoshizawa, Ibaragi; Masahiro Suzuki, Ibaragi; Toshinori Sugiyama, Ibaragi, all of Japan
[73] Assignee: Hitachi Maxell, Ltd., Osaka, Japan
[21] Appl. No.: 878,075
[22] Filed: Jun. 24, 1986
[30] Foreign Application Priority Data
Jun. 24, 1985 [JP] Japan ............................ 60-135981
[51] Int. Cl.$^4$ ............................................ G01D 15/14
[52] U.S. Cl. .................................... 369/280; 369/282; 369/290; 428/65; 428/66; 346/137; 430/945
[58] Field of Search ............ 369/290, 280, 282; 346/137; 428/65, 64, 66; 430/945

[56] References Cited
U.S. PATENT DOCUMENTS
4,555,716  11/1985  Odawara et al. ............... 346/137

Primary Examiner—Alexander S. Thomas
Attorney, Agent, or Firm—Birch, Stewart, Kolasch & Birch

[57] ABSTRACT

An optical recording disc comprises a first bonding recess formed near an outside surface of an optical recording disc in a bonding boundary portion between a cylindrical hub and a transparent disc substrate, a disc member bonded with said transparent disc substrate through said cylindrical hub, and a second bonding recess formed near the outside surface of said optical recording disc in a bonding boundary portion between said cylindrical hub and said disc member. Accordingly, said optical recording disc can prevent remainder of a bonding material for bonding a pair of said transparent disc substrates or said transparent disc substrate and said disc member together from pushing out of the outside surface of the optical recording disc, resulting in that focusing for reading and writing an information signal can be properly performed.

10 Claims, 18 Drawing Figures

OPTICAL RECORDING DISC

BACKGROUND OF THE INVENTION

1. Field of the Invention

The present invention relates to an optical recording disc, and more particularly, to an optical recording disc comprising a pair of transparent disc substrates, or a transparent disc substrate and a reinforcement substrate.

2. Decription of the Related Art

There is provided an optical recording disc comprising a pair of disc units 25, as shown in FIG. 1, or one disc unit 25 and a reinforcement disc unit 28, as shown in FIG. 2. The recording disc has a transparent disc substrate 21 made of glass, wherein each transparent disc substrate 21 has a center hole 20, a resin layer 23 formed on one surface of the transparent disc substrate 21, and a recording layer 42 formed on the surface of the resin layer 23. In the disc unit 25, a signal pattern 22, being one of pits corresponding to an information signal or guiding grooves corresponding to a tracking signal, is transferred to one surface of the resin layer 23.

In a double sided recording type optical recording disc, as shown in FIG. 1, a pair of the disc units 25 are bonded together through an inner hub 26 and an outer spacer 27 so that the resin layers 23 and the recording layers 24 of both of the disc units 25 face each other. On the other hand, in a single sided recording type optical recording disc, as shown in FIG. 2, the disc unit 25 and the reinforcement disc unit 28 comprising only the transparent disc substrate 21 are bonded together through the inner hub 26 and the outer spacer 27 so that the resin layer 23 and the recording layer 24 face the inside of the optical recording disc.

In the aforementioned optical recording disc, when a laser light is radiated from the upside of the surface of the transparent disc substrate 21 or the reinforcement unit 28, where the resin layer 23 and the recording layer 24 are not formed, onto the boundary surface between the resin layer 23 and the recording layer 24, the reflected light on the boundary surface is inputted and read as the information signal. On the other hand, an information signal is written into the recording layer 24 by radiating a laser light. Accordingly, it is necessary for the transparent disc substrate 21 to have a high transparency, a smooth surface, and a uniformity of thickness, and the laser incident surface of the transparent disc substrate 21 or the reinforcement unit 28 is polished so as to provide the necessary condition.

As shown in FIG. 3, however, the edge portions 29, 30, 31 and 32 of the inner rim portion and the outer rim portion of the transparent disc substrate 21 or the reinforcement unit 28 are not generally processed, since the edge portions 29, 30, 31, and 32 do not directly influence the reading and writing operation of the information signal into and from the optical recording disc. Therefore, rectangular edge portions of the transparent disc substrate 21 or the reinforcement unit 28 are formed without particular processing, such as cutting etc.

As shown in FIG. 4, the inner hub 26 comprises a cylindrical hub portion 26a and a cylindrical inner spacer portion 26b formed in the middle portion of the outer surface of the cylindrical hub portion 26a. The cylindrical inner spacer portion 26b acts as an inner spacer together with the outer spacer 27 when the optical recording disc is fabricated.

The inner hub 26 and the outer spacer 27 are bonded on the surface of the disc unit 25 as follows. First, a proper quantity of bonding material 33 is coated on the outer surface of the cylindrical hub portion 26a and the top and the bottom surfaces of the inner spacer portion 26b of the inner hub 26, respectively facing the transparent disc substrate 21, as shown in FIG. 4, and a proper quantity of the bonding material 33 is coated on the top and the bottom surfaces of the outer spacer 27, respectively facing the transparent disc substrate 21. Then, the transparent disc substrate 21 is pushed to the surfaces of the inner hub 26 and the outer spacer 27, where the bonding material is coated as described above, and the coated bonding material is extended by pushing, resulting in the inner hub 26 and the outer spacer 27 being bonded on the transparent disc substrate 21. In this case, there is no space for accommodating the remainder 33a of the bonding material 33, as shown in FIG. 5, since the rectangular edges 29, 30, and 31 are formed in the inner and outer rim portions of the inside surface of the transparent disc substrate 21, resulting in the remainder 33a of the bonding material 33 being pushed out of the top and the bottom surfaces of the transparent disc substrate 21 and the side surface of the transparent disc substrate 21. It was suggested in Japanese patent laid open No. 185233/1985 that a bonding recess be formed in the inner spacer and/or the outer spacer, however, the bonding recess could not prevent the remainder 33a from pushing out of the top and the bottom surfaces of the transparent disc substrate 21 and the side surface of the transparent disc substrate 21.

In particular, after the remainder 33a of the bonding material 33 is pushed out of the top and the bottom surfaces of the transparent disc substrate 21, this remainder 33a of the bonding material 33 solidifies. When the optical recording disc, with the solidified remainder 33a of the bonding material 33 on the top and the bottom surfaces, is set on a turn table of a recording and play back device as in FIG. 6, the optical recording disc is not horizontally set on the turn table of the recording and play back device, that is, the top and the bottom surfaces of the transparent disc substrate 21 are not parallel to the turn table, resulting in that it is difficult for the laser light radiated from a light head 38 to focus on the boundary surface between the resin layer 23 and the recording layer 24, when the turn table of the recording and play back device is rotating.

In addition, when the optical recording disc with the rectangular edges 29, 30, 31, and 32 of the transparent disc substrate 21 is handled, there is a problem that the rectangular edges 29, 30, 31, and 32 of the transparent disc substrate 21 can not avoid contact with the handle's fingers.

SUMMARY OF THE INVENTION

An essential object of the present invention is to provide an optical recording disc without the remnants of bonding material pushed out on top and the bottom surface of a transparent disc substrate or a reinforcement disc member in the optical recording disc, such that an information signal can be read and written properly from and into a recording layer formed on the transparent disc substrate.

According to the present invention, there is provided an optical recording disc comprising a cylindrical hub having a center hole for the insertion of a spindle of a recording and play back device, a transparent disc substrate having a center hole for insertion of the cylindrical hub, a first bonding recess formed near the outside surface of the optical recording disc at a bonding boundary portion between the cylindrical hub and the transparent disc substrate, a resin layer formed on one surface of the transparent disc substrate on which a signal pattern is formed, the signal pattern being at least one of pits corresponding to an information signal or grooves corresponding to a tracking signal, a recording layer formed on the resin layer, a disc member being one of the transparent disc substrate or a reinforcement disc, the disc member being bonded with the transparent disc substrate through the cylindrical hub, and a second bonding recess formed near the outside surface of the optical recording disc at a bonding boundary portion between the cylindrical hub and the disc member.

Accordingly, the optical recording disc of the present invention can prevent a remainder of a bonding material for bonding a pair of transparent disc substrates or transparent disc substrate and disc member together from pushing out on to the outside surface of the optical recording disc, resulting in that focusing for reading and writing of an information signal can be properly performed.

DETAILED DESCRIPTION OF THE PREFERRED EMBODIMENTS

Figure 1:
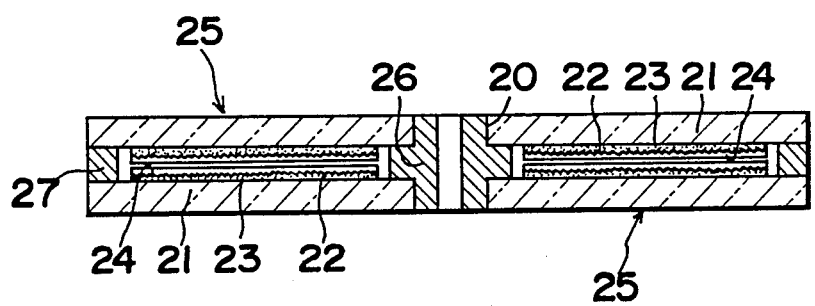
FIG. 1 is a longitudinal cross sectional view of a conventional optical recording disc comprising a pair of disc units.
Figure 2:
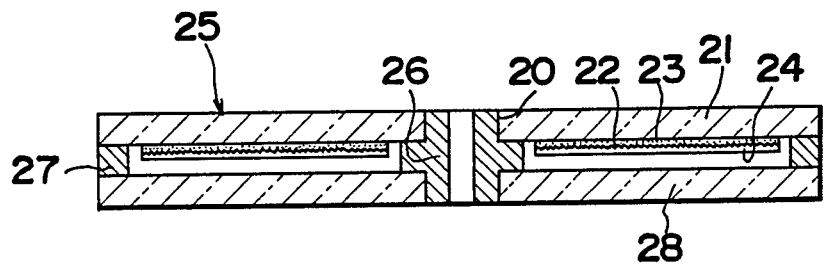
FIG. 2 is a longitudinal cross sectional view of a conventional optical recording disc comprising a disc unit and a reinforcement unit.
Figure 3:
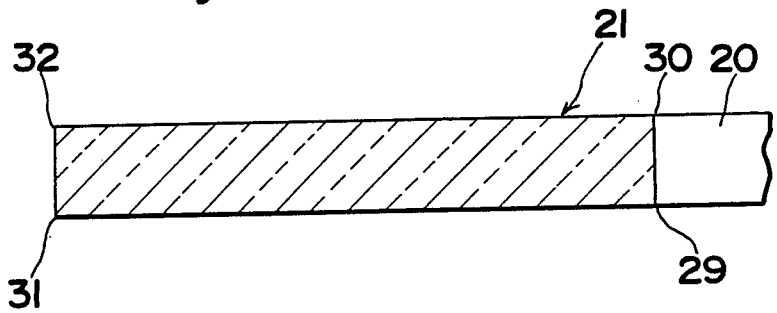
FIG. 3 is a partially enlarged longitudinal cross sectional view of the disc unit shown in FIGS. 1 and 2.
Figure 4:
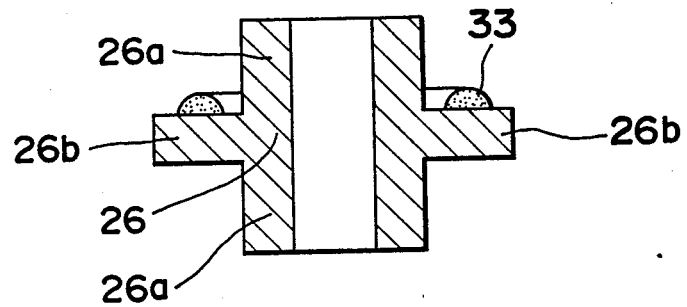
FIG. 4 is an enlarged longitudinal cross sectional view of an inner hub shown in FIGS. 1 and 2.
Figure 5:
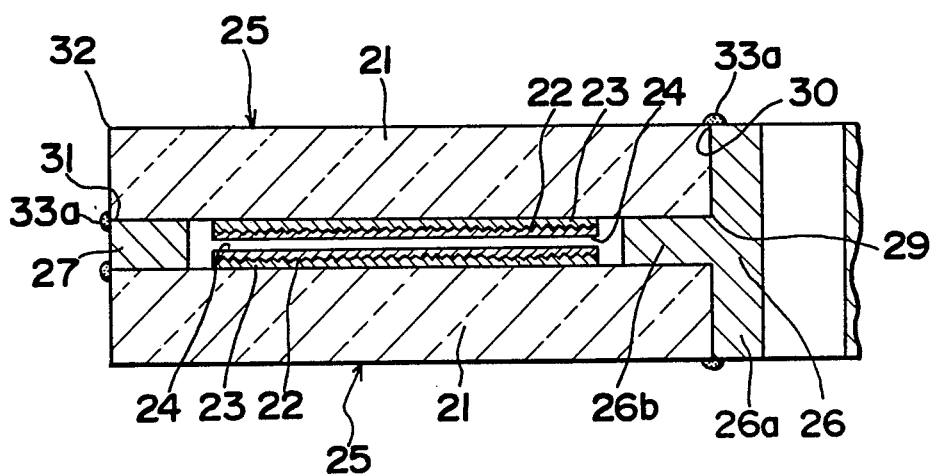
FIG. 5 is a partially enlarged longitudinal cross sectional view of the conventional optical recording disc shown in FIG. 1, showing a remainder of bonding material pushed out on the top, the bottom, and the side surfaces of the transparent disc substrate.
Figure 6:
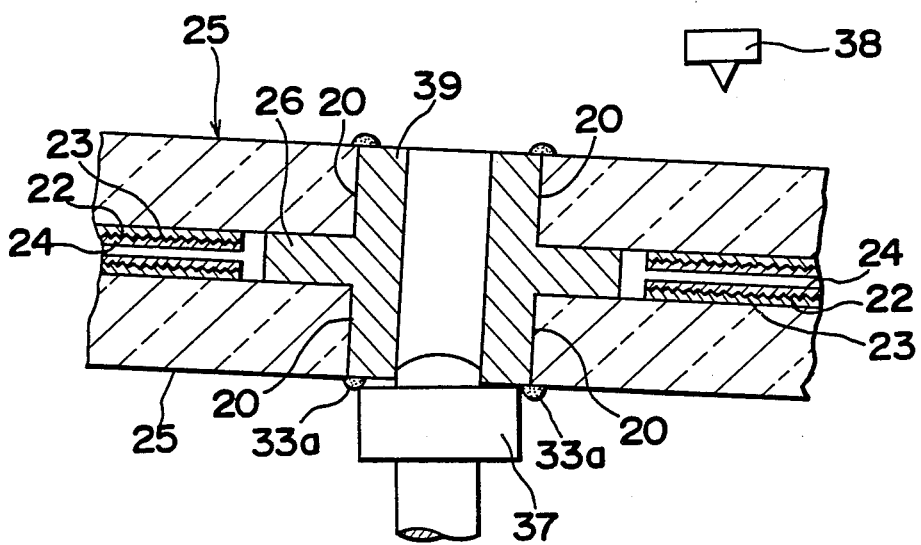
FIG. 6 is a partially enlarged longitudinal cross sectional view of the conventional optical recording disc shown in FIG. 1, showing a condition such that the conventional optical recording disc is not horizontally set on a turn table of a recording and play back device.
Figure 7:
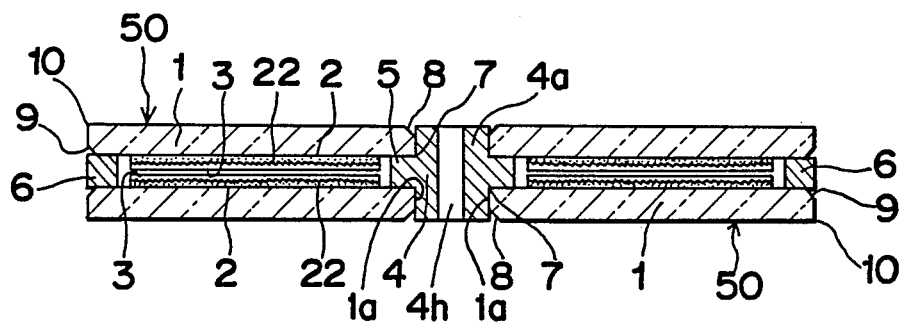
FIG. 7 is a longitudinal cross sectional view of an optical recording disc of a first preferred embodiment according to the present invention.
Figure 8:
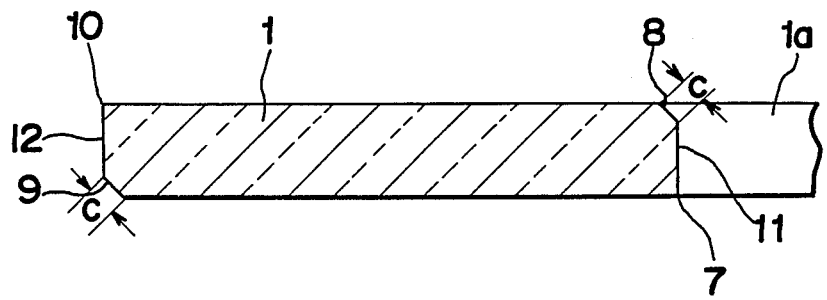
FIG. 8 is a partially enlarged longitudinal cross sectional view of a transparent disc substrate of the optical recording disc shown in FIG. 7.

FIG. 7 shows an optical recording disc of a first preferred embodiment according to the present invention, and FIG. 8 is a partially enlarged longitudinal cross sectional view of a transparent disc substrate 1. In the optical recording disc, there is provided a pair of the transparent disc substrate 1 made of glass or plastic resin material, a resin layer 2 made of plastic resin material formed on one surface of each of the transparent disc substrates 1, and a recording layer 3 formed on the resin layer 2, resulting in a disc unit 50. A pair of disc units 50 are bonded together by an inner hub 4 and an outer spacer 6 so that the resin layers 2 and the recording layers 3 of each of the disc units 50 face each other respectively. The inner hub 4 comprises a cylindrical hub portion 4a and a cylindrical inner spacer portion 5 arranged at the middle of the outer surface of the cylindrical hub portion 4a, wherein the cylindrical hub portion 4a of the inner hub 4 has a spindle center hole 4h for inserting a spindle of a recording and play back device. Each of the transparent disc substrates 1 has a center hole 1a, into which the cylindrical inner hub portion 4a is inserted so that the outer surface of the cylindrical hub portion 4a of the inner hub 4 faces the inner side surface of the corresponding transparent disc substrate 1.

An entire inner rim portion 8 of the outside surface and an entire outer rim portion of the inside surface of each of the transparent disc substrates 1 are processed so as to form chamfer portions having an inclined surface which is shown in the longitudinal cross sectional view of FIG. 8. The width C of the chamfer portions formed on the entire inner rim portion 8 and the entire outer rim portion 9 can be in such a range so that the inner and the outer side surfaces 11 and 12 become the shape of a straight line in the longitudinal cross sectional view of FIG. 8. When the width C of the chamber portion formed in the portions 8 and 9 is increased, the chamber portions can effectively prevent the remainder 33a of the bonding material 33 from pushing or exuding out from the top, bottom and the side surfaces of the transparent disc substrates 1; however, the bonding area is reduced, resulting in the problem that a pair of the disc units 50 can not be strongly bonded together through the inner hub 4 and the outer spacer 6. Taking into account the aforementioned condition, the width C of the chamfer portion formed in the portions 8 and 9 is preferably in the range of from 0.1 mm to 0.3 mm, when the thickness of the transparent disc substrate 1 is in the range of from 1.0 mm to 1.5 mm, the inner diameter of the transparent disc substrate 1 is in the range of 70 mm to 90 mm, the outer diameter of the inner spacer portion 5 of the inner hub 4 is in the range of 90 mm to 110 mm, the inner diameter of the spindle center hole 4h of the inner hub 4 is 35 mm, and the thickness of the outer spacer 6 and the inner spacer portion 5 of the inner hub 4 is in the range of 0.4 mm to 0.8 mm.

The roughness of the chamber portions formed in the portions 8 and 9 of the transparent disc substrate 1 can be any roughness, wherein the roughness of the respective chamfer portion is defined hereinafter as the distance between the peaks of the rough surface of the chamfer portion. When the bonding material is coated on the chamfer portions, the roughness of the chamfer portions is preferably in the range of from 20 $\mu$m to 100 $\mu$m so as to bond the inner hub 4 and the outer spacer 6 to the surface of the transparent disc substrate 1. On the other hand, when the bonding material is not coated on the chamfer portions, the chamfer portions may be a smooth surface having a roughness in the range of from 1.5 $\mu$m to 6.0 $\mu$m. Therefore, the chamfer portion formed as the outer rim portion 9 of the inside surface of the transparent disc substrate 1 is preferably processed so as to have a relatively smooth surface having a roughness in the range of from 0.1 $\mu$m to 6.0 $\mu$m. On the other hand, the chamber portion formed as the inner rim portion 8 of the outside surface of the transparent disc substrate 1 is a preferably processed so as to have a relatively rough surface having a roughness in the range of from 20 $\mu$m to 100 $\mu$m.

Figure 9:
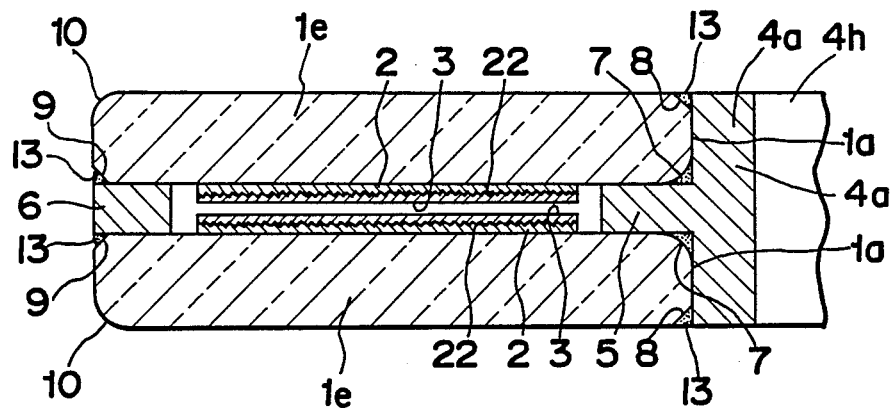
FIG. 9 is an enlarged longitudinal cross sectional view of an optical recording disc comprising a transparent disc substrate shown in FIG. 12.

As described above, in the optical recording disc comprising a pair of the transparent disc substrates 1 where the chamfer portions formed as the inner rim portion 8 of the outside surface and the outer rim portion 9 of the inside surface, after the bonding material is coated on the outer surface of the cylindrical hub portion 4a, and the top and the bottom surfaces of the inner spacer portion 5 of the inner hub 4, and the top and the bottom surfaces of the outer spacer 6, a pair of the disc units 50 comprising the transparent disc substrate 1 are bonded to the inner hub 4 and the outer spacer 6, resulting in the remainder 13 of the bonding material 33 as seen in FIG. 9, remains in a space formed between the chamfer portion formed in the inner rim portion 8 and the outer surface of the cylindrical inner hub portion 4a of the inner hub 4, and in a space between the chamfer portion formed in the outer rim portion 9 and the top and the bottom surfaces of the outer spacer 6. As a result, the chamfer portions formed in the portions 8 and 9 can prevent the remainder 13 of the bonding material 33 from exuding out on to top, the bottom, and the side surface of the transparent disc substrate 1. In the aforementioned first preferred embodiment, a relatively large quantity of the remainder 13 of the bonding material 33 remains in the chamfer portions since each chamfer portion is formed so as to have an inclined surface, resulting in that the process cost becomes inexpensive, and also the inner hub 4 and the outer spacer 6 are strongly bonded to the surface of the transparent disc substrate 1.

Figure 10:
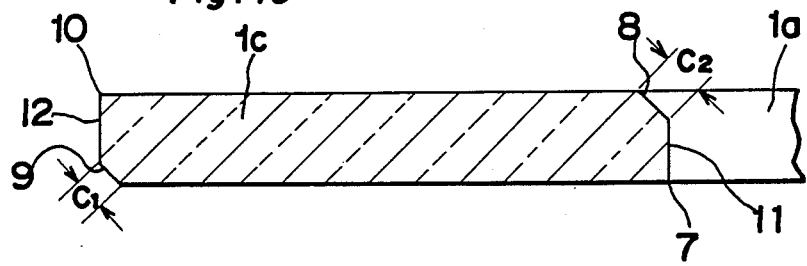
FIG. 10 is a partially enlarged longitudinal cross sectional view of a transparent disc substrate of a second preferred embodiment according to the present invention.

FIG. 10 shows a transparent disc substrate 1c of an optical recording disc of a second preferred embodiment according to the present invention. As shown in FIG. 10, in the transparent disc substrate 1c, the entire inner rim portion 8 of the outside surface of the transparent disc substrate 1c is processed so as to form a chamfer portion of a width C2 having an inclined surface, on the other hand, the entire outer rim portion 9 of the inide surface of the transparent disc substrate 1c is processed so as to form a chamfer portion of a width C1 having an inclined surface, the width C1 being different from the width C2. The optical recording disc comprising a pair of the transparent disc substrates 1c has also the same effect as the effect of the optical recording disc comprising a pair of the transparent disc substrates 1 shown in FIG. 7. The widths C1 and C2 of the chamfer portions are preferably in the range of from 0.1 mm to 0.3 mm.

Figure 11:
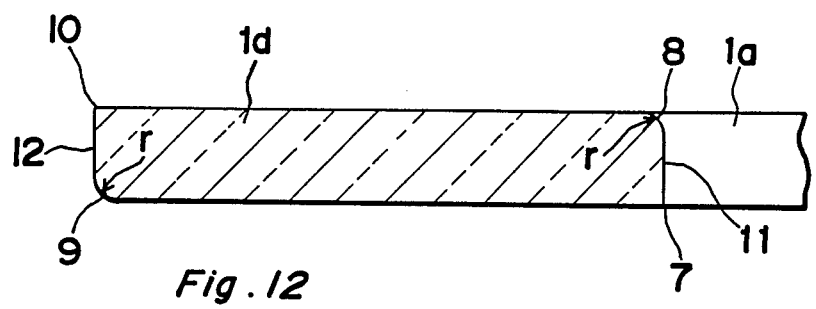
FIG. 11 is a partially enlarged longitudinal cross sectional view of a transparent disc substrate of a third preferred embodiment according to the present invention.

FIG. 11 shows a transparent disc substrate 1d of an optical recording disc of a third preferred embodiment according to the present invention. As shown in FIG. 11, in the transparent disc substrate 1d, the entire inner rim portion 8 of the outside surface of the transparent disc substrate 1d is processed so as to form a chamfer portion of a fillet radius r having a curved surface, on the other and, the entire outer rim portion 9 of the inside surface of the transparent disc substrate 1d is processed so as to form a chamfer portion of the same fillet radius r having a curved surface as the radius of the chamfer portion formed in the inner rim portion 8. The optical recording disc comprising a pair of the transparent disc substrates 1d has also the same effect as the effect of the optical recording disc comprising a pair of the transparent disc substrates 1 shown in FIG. 7. In the transparent disc substrate 1d, the radius r is in the range of from 0.1 mm to 0.8 mm, and is preferably in the range of from 0.1 mm to 0.6 mm, when the transparent disc substrate 1d has the same thickness and the same inner diameter as those of the transparent disc substrate 1, and the outer spacer 6, and the inner hub 4 are used.

Figure 12:
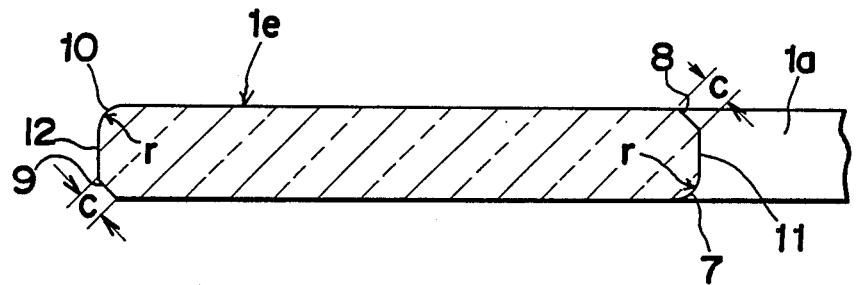
FIG. 12 is a partially enlarged longitudinal cross sectional view of a transparent disc substrate of a fourth preferred embodiment according to the present invention.

FIG. 12 shows a transparent disc substrate 1e of an optical recording disc of a fourth preferred embodiment according to the present invention. As shown in FIG. 12, in the transparent disc substrate 1e, the entire inner rim portion 8 of the outside surface of the transparent disc substrate 1e is processed so as to form a chamfer portion of a width C having an inclined surface, on the other hand, the entire outer rim portion 9 of the inside surface of the transparent disc substrate 1e is processed so as to form a chamfer portion of the same width C having an inclined surface as the width of the chamfer portion formed in the inner rim portion 8. Moreover, the entire inner rim portion 7 of the inside surface of the transparent disc substrate 1e is processed so as to form a chamfer portion of a fillet radius r having a curved surface, on the other hand, the entire outer rim portion 10 of the outside surface of the transparent disc substrate 1e is processed so as to form a chamfer portion of the same fillet radius r having a curved surface as the radius of the chamfer portion formed in the inner rim portion 7. In the transparent disc substrate 1e, the width C of the chamfer portion and the radius r of the chamfer portion are preferably in the aforementioned range.

FIG. 9 shows the fabricated optical recording disc of the fourth preferred embodiment comprising a pair of the transparent disc substrates 1e which has the same effect as the effect of the optical recording disc comprising a pair of the transparent disc substrates 1 shown in FIG. 7, and the optical recording disc of the fourth preferred embodiment has the advantages described below. That is, it is easy for the inner hub 4 to be inserted into the center hole 1a, since the chamfer portions having the curved surface are formed in the portions 7 and 10 of the transparent disc substrate 1, resulting in that the chamfer portions having curved surface can prevent the transparent disc substrate 1 from cutting and breaking, and the chamfer portions can prevent the resin layer 2 and the recording layer 3 from being damaged. The tolerance for inserting the inner hub 4 into the center hole 1a of the transparent disc substrate 1 can be small, resulting in a decrease in the rate of the tracking error. The chamfer portions having the inclined and the curved surfaces of the transparent disc substrate 1 can also avoid possible injury to fingers.

Figure 13:
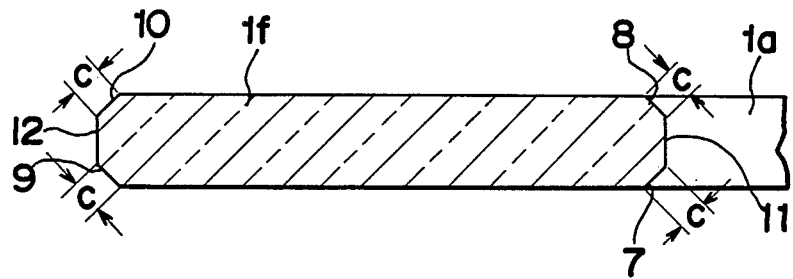
FIG. 13 is a partially enlarged longitudinal cross sectional view of a transparent disc substrate of a fifth preferred embodiment according to the present invention.
Figure 14:
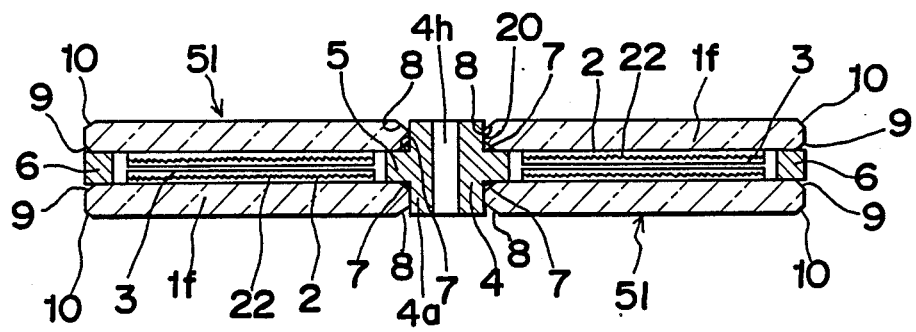
FIG. 14 is a longitudinal cross sectional view of an optical recording disc comprising the transparent disc substrate shown in FIG. 13.

FIG. 13 shows a transparent disc substrate 1f of an optical recording disc of a fifth preferred embodiment according to the present invention. As shown in FIG. 13, in the transparent disc substrate 1f, both of the entire inner rim portions 7 and 8 of the inside and the outside surfaces of the transparent disc substrate 1f are processed so as to form chamfer portions of a width C having an inclined surface, on the other hand, both of the entire outer rim portions 9 and 10 of the inside and the outside surfaces of the transparent disc substrate 1f are processed so as to form chamfer portions of the same width C having an inclined surface as the width of the chamfer portion formed in the portions 7 and 8. FIG. 14 shows the optical recording disc of the fifth preferred embodiment comprising a pair of disc units 51 having the transparent disc substrate 1f. The optical recording disc comprising a pair of the disc units 51 has also the same effect as the effect of the optical recording disc comprising a pair of the disc units 50 shown in FIG. 7. In the transparent disc substrate 1f, the width C of the chamfer portions are preferably in the aforementioned range.

Figure 15:
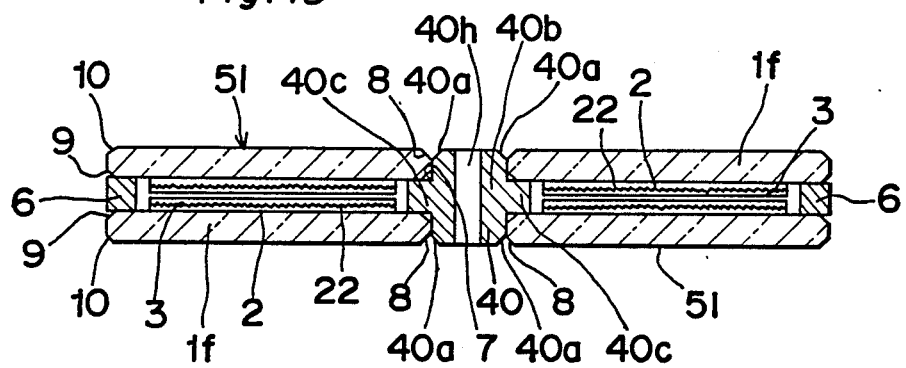
FIG. 15 is a longitudinal cross sectional view of an optical recording disc comprising a pair of the transparent disc substrates shown in FIG. 13 and an inner hub having chamber portions, the optical recording disc being a sixth preferred embodiment according to the present invention.

FIG. 15 shows an optical recording disc of a sixth preferred embodiment according to the present invention, wherein the optical recording disc shown in FIG. 15 comprises the disc units 51 and an inner hub 40 having chamfer portions formed in the portion 40a. The inner hub 40 comprises a cylindrical hub portion 40b and a cylindrical inner spacer portion 40c formed in the middle portion of the cylindrical inner hub portion 40b, wherein the cylindrical inner spacer portion 40c acts as an inner spacer as well as the cylindrical inner spacer portion 5 of the inner hub 4 shown in FIG. 7, and the cylindrical hub portion 40b has a spindle center hole 40h. The entire outer rim portions 40a of both of the top and the bottom surfaces of the cylindrical hub portion 40b are processed so as to form chamfer portions of a width C having an inclined surface. In the optical recording disc comprising a pair of the disc units 51 and the inner hub 40, the chamfer portion formed in the portion 8 of the transparent disc substrate 1f and the chamfer portion formed in the portion 40a of the inner hub 40 can accommodate the remainder of the bonding material coated on the outer surface of the cylindrical inner hub portion 40b of the inner hub 40, resulting in that a relatively quantity of the remainder of the bonding material remains in the chamfer portions formed in the portions 8 and 40a, a resulting in that the transparent disc substrate 1f is more strongly bonded on the outer surface of the cylindrical inner hub portion 40b of the inner hub 40. The chamfer portion formed in the portion 9 of the transprent disc substrate 1f has also the aforementioned effect.

Figure 16:
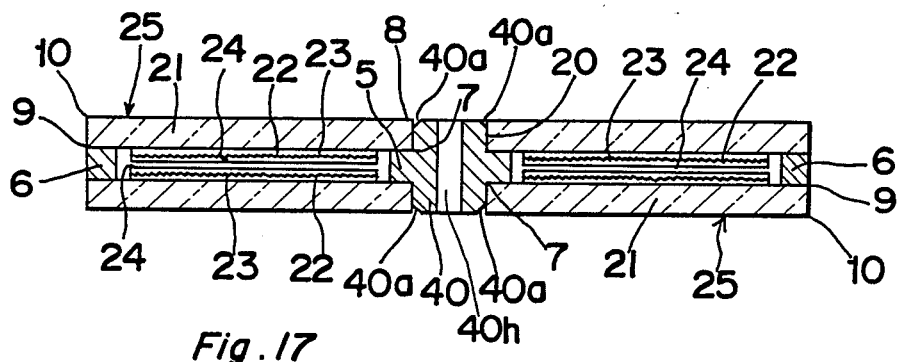
FIG. 16 is a longitudinal cross sectional view of an optical recording disc comprising a pair of the conventional transparent disc substrates shown in FIG. 1 and an inner hub having chamber portions, the optical recording disc being a seventh preferred embodiment according to the present invention.

FIG. 16 shows an optical recording disc of a seventh preferred embodiment according to the present invention, wherein the optical recording disc comprises a pair of the conventional disc units 25 and the inner hub 40. Each of the disc units 25 has no chamfer portion, however, the inner hub 40 has the chamfer portions having an inclined surface formed in the entire outer rim portions 40a of the top and the bottom surfaces of the cylindrical inner hub portion 40b, as described above, resulting in the remainder of the bonding material coated on the outer surface of the cylindrical hub portion 40b of the inner hub 40 remaining in the chamfer portion formed in the portions 40a of the inner hub 40. Therefore, the optical recording disc of the seventh preferred embodiment comprising a pair of the disc units 51 and the inner hub has the same effect as the optical recording disc of the first preferred embodiment shown in FIG. 7.

Figure 17:
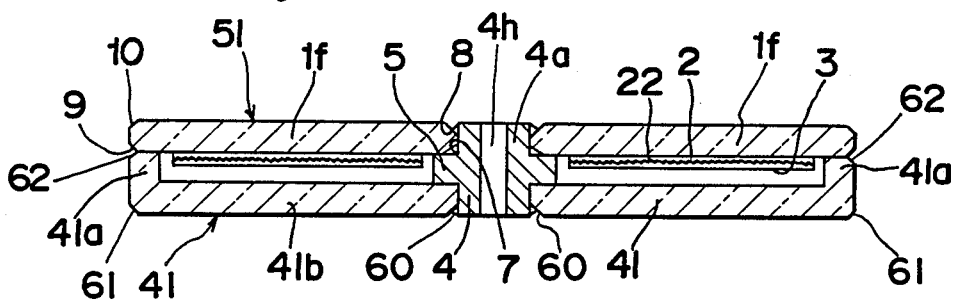
FIG. 17 is a longitudinal cross sectional view of an optical recording disc comprising the transparent disc substrates shown in FIG. 13 and a reinforcement unit having an outer spacer portion, the optical recording disc being a eighth preferred embodiment according to the present invention.

FIG. 17 shows an optical recording disc comprising the disc unit 51, a reinforcement unit 41, and the inner hub 4, wherein the transparent disc substrate 1f of the disc unit 51 has the chamfer portions having an inclined surface formed in the portions 7, 8, 9, and 10, the reinforcement unit 41 comprises an outer spacer portion 41a and a transparent disc portion 41b made of glass or plastic resin material, and the disc unit 51 and the reinforcement unit 41 are bonded together through the inner hub 4 and the outer spacer portion 41a of the reinforcement unit 41 so that the resin layer 2 and the recording layer 3 face the inside of the optical recording disc. In FIG. 17, the outer spacer portion 41a of the reinforcement unit 41 acts as an outer spacer as well as the outer spacer 6 shown in FIG. 7. The entire inner rim portion 60 of the outside surface of the transparent disc portion 41b of the reinforcement unit 41 is processed so as to form a chamfer portion of a width C having an inclined surface, on the other hand, the entire outer rim portion 61 of the outside surface of the transparent disc portion of the reinforcement unit 41 is also processed so as to form a chamfer portion of a width C having an inclined surface. Moreover, the outer rim portion 62 of the outer spacer portion 41a of the reinforcement unit 41 is also processed so as to form a chamfer portion of a width C having an inclined surface. As a result, the remainder of the bonding material coated on the outer surface of the cylindrical hub portion 4a of the inner hub 4 can remain in a space between the chamfer portion formed in the portion 60 of the reinforcement unit 41 and the chamfer portion formed in the portion 8 of the transparent disc substrate 1f, therefore, the chamfer portion formed in the portions 60 and 8 can prevent the remainder of the bonding material from exuding out on to the outside surfaces of the transparent disc substrate 1f and the reinforcement unit 41. The remainder of the bonding material coated on the top surface of the outer spacer portion 41a of the reinforcement unit 41 can remain in a space between the chamfer portion formed in the portion 62 of the outer spacer portion 41a of the reinforcement unit 41 and the chamfer portion formed in portion 9 of the transparent disc substrate 1f, therefore, the chamfer portions formed in the portions 62 and 9 can prevent the remainder of the bonding material from exuding out of the side surface of the outer spacer portion 41a of the reinforcement unit 41.

Figure 18:
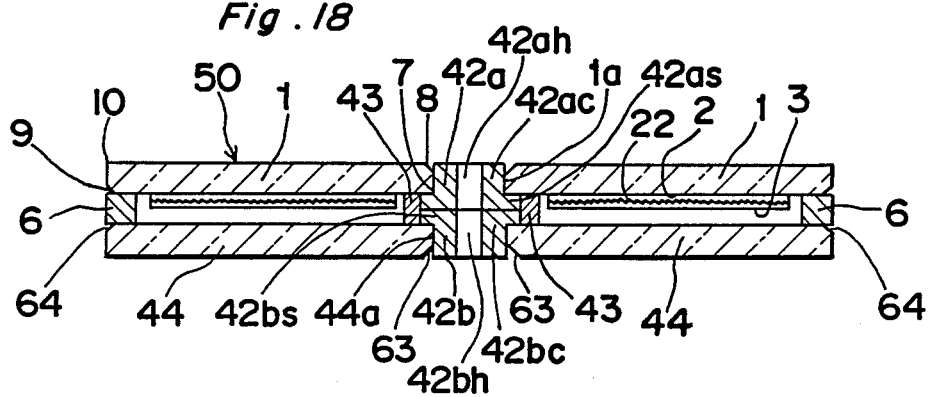
FIG. 18 is a longitudinal cross sectional view of an optical recording disc comprising the conventional transparent disc substrates shown in FIG. 1 and a pair of inner hub haves, the optical recording disc being a ninth preferred embodiment according to the present invention.

FIG. 18 shows an optical recording disc of a ninth preferred embodiment according to the present invention, wherein the optical recording disc comprises the disc unit 50 and a reinforcement disc unit 44, the disc unit 50 and the reinforcement disc unit 44 are bonded together through an inner spacer 43, inner hub halves 42a and 42b, and the outer spacer 6, so that the resin layer 2 and the recording layer 3 formed on the transparent disc substrate 1 of the disc unit 50 face the inside of the optical recording disc. The transparent disc substrate 1 has the center hole 1a as described above, and the reinforcement disc unit 44 has a center hole 44a. The inner hub halves 42a has the cylindrical shape as the inner hub halves 42b, and the inner hub halves 42a and 42b comprises cylindrical hub portions 42ac and 42bc, and cylindrical inner spacer portions 42as and 42bs, respectively. Each of the inner hub halves 42a and 42b have center spindle holes 42ah and 42bh into which a spindle of a recording and play back device is inserted. The entire inner rim portion 63 of the outside surface of the reinforcement unit 44 is processed so as to form a chamfer portion of a width C having an inclined surface, and the entire outer rim portion 64 of the inside surface of the reinforcement disc unit 44 is processed so as to form a chamfer portion of a width C having an inclined surface.

The fabricating process will be described below, referring to FIG. 18. First of all, after the resin layer 2 is formed on one surface of the transparent disc substrate 1, the recording layer 3 is formed on the resin layer 2, resulting in that the disc unit 51 is fabricated. Then, after the bonding material is coated on the outer surface of the inner hub half 42a, the inner hub half 42a is inserted into the center hole 1a of the transparent disc substrate 1. On the other hand, after the bonding material is coated on the outer surface of the inner hub half 42b, the inner hub half 42b is inserted into the center hole 44a of the reinforcement disc unit 44. Then, after the facing surfaces of each of the inner hub halves 42a and 42b, and the top and the bottom surfaces of the inner spacer 43, and the outer spacer 6 are coated with the bonding material, the disc uint 50 with the inner hub half 42a and the reinforcement disc unit 44 with the inner hub half 42b are bonded together through the inner spacer 43, and the outer spacer 6, so that the resin layer 2 and the recording layer 3 formed on the transparent disc substrate 1 face the inside of the optical recording disc, resulting in that the optical recording disc shown in FIG. 18 is fabricated.

The optical recording disc of the ninth preferred embodiment shown in FIG. 18 has the same effect as the optical recording disc of the first preferred embodiment shown in FIG. 7, and also has an advantage that it is easy to position the center of the disc unit 50 and the reinforcement disc unit 44, by using the inner hub halves 42a and 42b. The width C of the chamfer portions formed in the portions 8 and 9 of the transparent disc substrate 1 and in the portions 63 and 64 of the reinforcement disc unit 44 is preferably in the range of 0.1 mm to 0.3 mm, when the thickness of the transparent disc substrate 1 is in the range of 1.0 mm to 1.5 mm, the outer diameter of the cylindrical hub portions 42ac and 42bc of the inner hub halves 42a and 42b is in the range of 65 mm of 85 mm, the inner diameter of the inner halves 42a and 42b is 35 mm, the outer diameter of the inner spacer portions 42as and 42bs of the inner hub halves 42a and 42b is in the range of 70 mm to 100 mm, the outer diameter of the inner spacer 43 is in the range of 90 mm to 120 mm, and the thickness of the outer spacer 6 is in the range of 0.4 mm to 0.8 mm.

In the aforementioned optical recording disc comprising the transparent disc substrate having the different shape between the inside surface and the outside surface of the entire outer rim portion or the entire inner rim portion, such as the optical recording disc of the first, the second, the third, and the fourth preferred embodiment shown in FIGS. 7, 10, 11, and 12, the top and the bottom surfaces of the transparent disc substrate can be distinguished by looking at the shape of the predetermined rim portion without the measurement device of the flatness of the transparent disc substrate, resulting in that the optical recording disc can increase the productivity of the optical recording disc having the resin layer and the recording layer formed on the relatively rough surface of the transparent disc substrate.

In FIGS. 7 to 16, the double sided recording type optical recording discs are described above, and in FIGS. 17 and 18, the single sided recording type optical recording discs are described above. The transparent disc substrate bonded with the reinforcement disc unit is limited to the transparent disc substrates 1 and 1f, and may be the transparent disc substrate 1c, 1d, and 1e shown in FIGS. 10 to 12.

In the aforementioned optical recording disc, the transparent disc substrates 1, 1c, 1d, 1f, the reinforcement unit 41, and the reinforcement disc unit 44 may be made of glass or resin material, such as polycarbonate resin material, acrylic resin material, and PMMA resin material etc.. An inner hub is generally made of metal such as stainless steal etc., and a spacer is generally made of metal such as aluminum etc., however, the outer spacer 6, the inner hubs 4 and 40, the inner hub halves 42a and 42b, and the inner spacer 43 may be made of resin material, such as acrylic resin material, polycarbonate resin material and the like.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:
1. An optical recording disc comprising:
a cylindrical hub having a center hole for insertion of a spindle of a recording and playback device,
a first disc unit comprising a first transparent disc substrate having a center hole in which said cylindrical hub is inserted and bonded, a resin layer formed on an inner surface of said transparent disc substrate and a recording layer formed on said resin layer, and
a disc member being one of a second disc unit comprising a second transparent disc substrate having a center hole in which said cylindrical hub is inserted and bonded, a resin layer formed on an inner surface of said second transparent disc substrate and a recording layer formed on said resin layer or a reinforcement disc comprising a reinforcement disc substrate bonded to said cylindrical hub, said first transparent disc substrate including a first chamfer portion for receiving a bonding material for bonding said cylindrical hub and said first transparent disc substrate, said first chamfer portion being formed in a rim portion of an outside surface of said first transparent disc substrate at a boundary between said cylindrical hub and said transparent disc substrate, said second transparent disc substrate or reinforcement disc substrate of said disc member including a second chamfer portion for receiving a bonding material to bond said cylindrical hub and said transparent disc substrate or said reinforcement disc substrate, said second chamfer portion being formed in a rim portion of an outside surface of said second transparent disc substrate or said reinforcement disc substrate at a boundary portion between said cylindrical hub and said respective disc member.

2. The optical recording disc of claim 1, wherein each of said first and second chamfer portions is formed in the entire inner rim portion of the outside surface of each of said first transparent disc substrate and said disc member.

3. The optical recording disc of claim 1, wherein each of said first and second chamfer portions has an inclined surface.

4. The optical recording disc of claim 1, wherein each of said first and second chamfer portions has a curved surface.

5. The optical recording disc of claim 1, wherein each of said first and second chamfer portions is a relatively rough surface having a roughness corresponding to a distance between peaks of said rough surface in the range of from 20 $\mu$m to 100 $\mu$m.

6. The optical recording disc of claim 1, further comprising:
a cylindrical outer spacer mounted between outer rim portions of said first transparent disc substrate and said disc member,
a third chamfer portion formed in the entire outer rim portion of the inside surface of said first transparent disc substrate, and
a fourth chamfer portion formed in the entire outer rim portion of the inside surface of said disc member.

7. The optical recording disc of claim 6 further comprising:
further chamfer portions formed in the entire outer rim portion of the outside surface of each of said first transparent disc substrate and said disc member and in the entire inner rim portion of the inside surface of each of said first transparent disc substrate and said disc member.

8. The optical recording disc of claim 1, wherein each of said first second chamfer portions is formed in the entire inner rim portion of the outside surface of each of said first transparent disc substrate and said disc member, and additional chamfer portions are formed in the entire outer rim portion of top and bottom surfaces of said cylindrical hub.

9. The optical recording disc of claim 1, wherein additional chamfer portions are formed in the entire outer rim portion of top and bottom surfaces of said cylindrical hub.

10. The optical recording disc of claim 1, wherein said cylindrical hub includes an inner spacer protection which protrudes from a middle portion of an outer surface of said cylindrical hub.

* * * * *